May 22, 1962  O. HERMANN  3,035,468
SERVO CONTROLLED TOOL BLOCK
Filed Sept. 16, 1959  2 Sheets-Sheet 1

INVENTOR.
OTTO HERMANN
BY Toulmin & Toulmin
ATTORNEYS

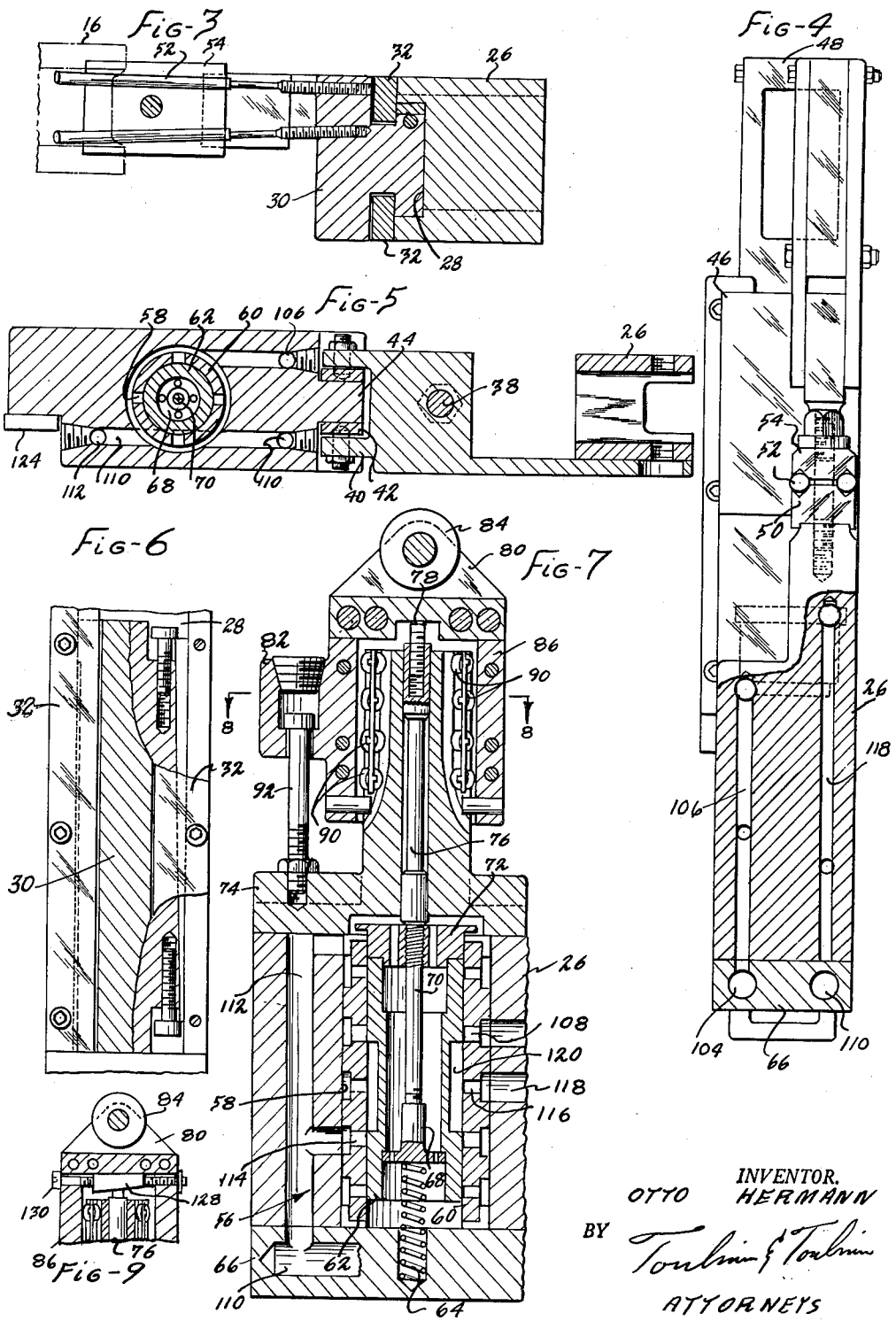

United States Patent Office 3,035,468
Patented May 22, 1962

3,035,468
SERVO CONTROLLED TOOL BLOCK
Otto Hermann, Cincinnati, Ohio, assignor to The R. K. Le Blond Machine Tool Co., Cincinnati, Ohio, a corporation of Delaware
Filed Sept. 16, 1959, Ser. No. 840,445
5 Claims. (Cl. 82—24)

This invention relates to machine tools such as lathes or grinders and is particularly concerned with a servomotor controlled tool block or tool unit for use in such a machine tool.

In the art of working metals in machine tools, servomotor controlled cutting tools are often employed. Usually hydraulic servomotors are utilized and the movement of the cutting tool, which may be a turning or grinding tool or a grinding wheel, is controlled by controlling the movement of the hydraulic fluid in the servomotor mechanism.

In the present invention, a fluid operated servomotor mechanism of the general nature referred to is embodied within a tool block that is mounted in a machine tool and the control of fluid flow in the servomotor mechanism is under the control of a valve that is influenced by the workpiece being operated.

An object of this invention is the provision of an integral servomotor operated unit that can be mounted in a machine tool in the same manner as a tool supporting block.

Another object of this invention is the provision of a servomotor controlled tool arrangement particularly adapted for use in connection with machine tools that work regions of the workpiece which follow an orbital path.

A still further object of this invention is the provision of a tool block for use in an orbital lathe or grinder which will automatically compensate for deviations in the orbit of the portion of the workpiece being worked so that the tool will remove a uniform depth of material from the workpiece.

A still further object of this invention is the provision of a tool block having a fluid operated servomotor integral therewith for moving the tool on the tool block of such a nature that a plurality of the tool blocks can be mounted to follow orbital paths in the machine, for example, to work the journals of one or more crank pins of a crankshaft.

It is also an object of the invention to provide an arrangement for finishing the fillets at the ends of the journals of shafts without causing the formation of ledges or shoulders at the ends of the journals.

A still further object is the provision of a tool block arrangement for a machine tool in which the positioning of the tool is influenced by the part being turned so that eccentric conditions of the workpiece are compensated for without the tool taking a cut greater than a predetermined depth on the workpiece.

These and other objects and advantages will become more apparent upon reference to the drawings in which:

FIGURE 3 is a sectional view indicated by line 3—3 on FIGURE 2;

FIGURE 4 is a front view partly in section looking in from the left side of FIGURE 2;

FIGURE 5 is a sectional view indicated by line 5—5 on FIGURE 2;

FIGURE 6 is a sectional view indicated by line 6—6 on FIGURE 2;

FIGURE 7 is a sectional view through the valve and stylus structure drawn at enlarged scale;

FIGURE 9 is a sectional view through the workpiece engaging end of the stylus structure showing the manner in which a tapered wedge member could be employed as an adjustable element therein.

Figure 1:
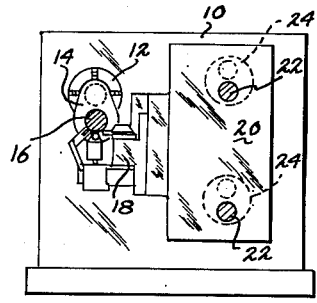
FIGURE 1 is a schematic representation of an orbital type turning machine in connection with which the present invention has particular utility.

The present invention applicable in many circumstances, such as in connection with turning machines, roll turning lathes, crankshaft lathes, and grinding machines of the conventional type and of the type which are utilized for machining crankshafts. In the drawings in this application the devices shown employ in connection with a crankshaft lathe turning fillets at the end of the crank pins journal but it will be understood that this represents merely, for example, of the uses to which the tool block could be put.

Referring to the drawings somewhat more in detail, the lathe arrangement which is diagrammatically illustrated in FIGURE 1 comprises a frame 10 having motor driven chuck means 12. The chuck means is adapted for receiving a workpiece such as a crankshaft 14 in a predetermined indexed position relative to the chuck means so that as the crankshaft rotates on the work axis that passes through the center of rotation of the chuck means, the crank pins 16 of the crankshaft will follow an orbital path.

For turning the crank pins there is provided the tool block arrangement 18 of which there is one for each crank pin being turned. Each tool block arrangement 18 is attached to a carrier block 20 within the frame with the carrier blocks being mounted on the crank pins 22 of master crankshafts 24. The master crankshafts 24 are geared directly to the chuck means 12 so that the master crankshafts rotate in synchronism with the crankshaft being turned. The master crankshafts are also oriented with the crankshaft being turned whereupon the supports 20 move in such a path that the tool blocks carried thereby take the same orbital path as the crank pins being turned thereby.

The present invention is not concerned with any particular lathe structure generally, but with the construction of the tool block which, although it has particular use in connection with the orbital type lathe shown, is not limited in utility to this particular type lathe.

FIGURES 2 thru 7 show more in detail the construction of the tool block unit. In these views the main body of the tool block is indicated at 26. This main body is adapted for being bolted to support 20 in fixed but adjustable relation thereto.

The main body 26 has a guideway 28 therein that receives a tracer slide 30. Tracer slide 30 is held in place in the guideway 28 by gib means 32 so that the tracer slide is movable on the main body in the direction of the guideway.

The tracer slide has a cylinder 34 formed therein in which is located double acting piston 36 that has a rod portion 38 fixedly attached to a member 40 extending forwardly from main body 26 toward the tracer slide. Member 40 at its outermost end carries the gib members 42 that engage opposite sides of a machined portion 44 of the tracer slide thereby assisting in locating the tracer slide and guiding it in its vertical sliding movements. Similarly there are machined surfaces at 46 on opposite sides of the tracer slide at the upper end thereof that are engaged between spaced surfaces on the support means 48 also rigid with the main body 26 and extending forwardly therefrom toward the tracer slide.

The tracer slide also has mounted thereon block 50 which receives turning tools 52 clamped in place by clamp means 54. In the present case the turning tools are in the form of rods and turn fillets at the opposite ends of the journal being treated, but it will be evident that other tools can be employed.

In a position substantially vertically beneath the center line of the crank pin 16 that is being turned by tools 52, there is located a servo valve structure generally indicated at 56. This valve structure is mounted within a bore 58 formed in the tracer slide and consists of an outer sleeve 60 and a reciprocable valve member 62 therein.

Valve member 62 is biased upwardly by a spring 64 that bears between the bottom plate 66 attached to the underneath side of the tracer slide and the nut 68 that engages a downwardly facing shoulder on the valve member and which is attached to a rod 70 extending upwardly through the valve member and attached to an upper nut 72 that engages the upper end of the valve member.

The upper end of the valve unit is closed by a stylus support member 74 fixed to the tracer slide and having a vertical central bore therein in which is mounted a rod 76 that engages the upper end of rod 70. The upper end of rod 76 receives the adjusting screw 78 that bears on the underneath side of the head part 80 of stylus slide 82. Head part 80 rotatably supports stylus roller 84 that engages the surface of crank pin 16.

Figure 8:
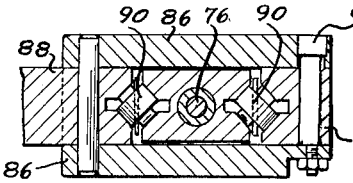
FIGURE 8 is a cross sectional view indicated by line 8—8 on FIGURE 7 showing the roller guide for the stylus support.

The stylus slide 82, as will be seen in FIGURE 8, comprises spaced plate members 86 that are bolted together with spacer plates 88 and 89 therebetween. Plates 88 and 89 along their inner surfaces and the outer faces of stylus support 74 are formed to provide surfaces between which the rollers 90 are mounted so that the stylus slide is guided accurately in its vertical sliding movements on the stylus support.

The bolts 91 which connect plate members 86 and retain the spacer plates 88 and 89 therebetween, are in the form of eccentrics so that by adjustment thereof spacer plate member 89 can be adjusted thereby to take up for any clearance in the bearings thereby to provide absolutely accurate guiding means for the stylus and its support.

A stop screw 92 is provided which limits the vertical movement of the stylus slide on the stylus support.

It will be evident that the valve member of the valve and the stylus slide and the stylus roller supported thereon will be urged vertically by spring 64 until stop screw 92 stops the stylus slide or until the stylus roller engages the surface of the workpiece.

Similarly, any downward movement of the stylus roller as caused by the workpiece will be accompanied by downward movement of the valve member.

In the arrangement shown, the stylus engages the pin journal between the filleting tools and since this portion of the journal has already been turned, the filleting tools follow a path that is concentric with the journal.

Turning now to the valve structure, valve sleeve 60 is provided with a plurality of annular grooves in which are located ports that communicate with the interior of the sleeve so that the ports can be controlled by the valve member. These annular grooves are connected by passages formed in the tracer slide with opposite sides of piston 36 and with pressure and exhaust passages in lower plate 66 and to which pressure and exhaust passages there are connected flexible hydraulic conduits.

In the arrangement illustrated the pressure conduit is shown at 100 and the exhaust conduit is at 102. Pressure conduit 100 communicates with a passage 104 in plate 66 that in turn communicates with a passage 106 in the tracer slide that leads to the underside or annular area of piston 36 and which also leads to the upper ports 108 in the valve sleeve.

The exhaust conduit 102 communicates with a passage 110 in plate 66 that connects with passage 112 in the tracer slide. This passage 112 connects with a lower annular groove in the valve sleeve that communicates by ports 114 with the interior of the valve sleeve.

There are also ports at 116 in the valve sleeve intermediate ports 108 and 114 that connect with an annular groove in the valve sleeve that communicates via the passage 118 with the upper side of piston 36.

Valve member 62 is so arranged with intermediate annular groove 120 so that in its intermediate position ports 108 and 114 are both substantially closed off whereas movement of the valve member upwardly will communicate ports 108 with ports 116 while movement downwardly of the valve member will communicate ports 114 with ports 116.

It will be evident from the foregoing that a supply of pressure via conduit 100 will cause pressure to stand on the annular underside of piston 36 thus urging the tracer slide downwardly on main body 26. If valve member 62 is now permitted to move upwardly under the influence of spring 64, ports 108 will be connected with ports 116 whereupon there will be a supply of pressure fluid through the valve and through passage 118 to the upper side of piston 36 whereupon the tracer slide will commence to move upwardly.

Figure 2:
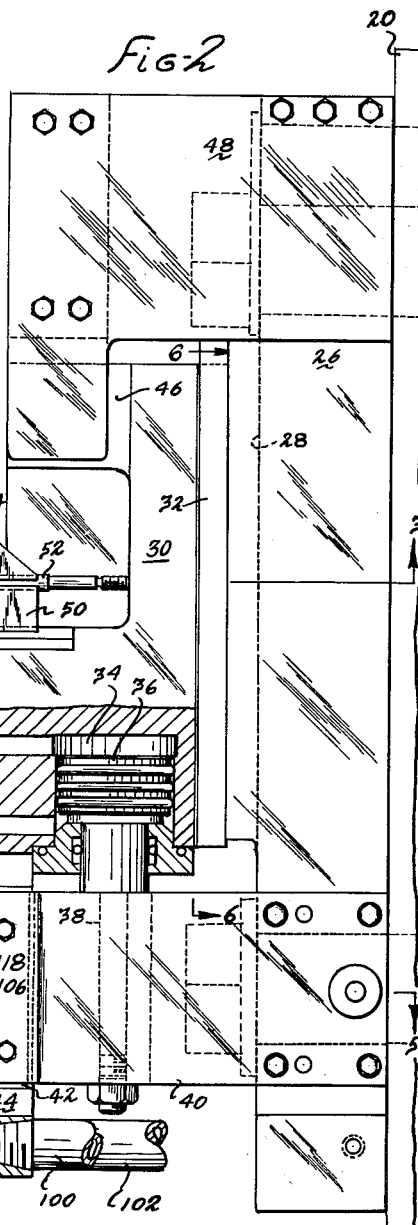
FIGURE 2 is a view drawn at greatly enlarged scale of the tool block of the present invention partly in section showing the actuating motor for the movable part of the tool block, the control valve for the motor, and the stylus that actuates the control valve.

This upward movement of the tracer slide will continue until the piston 36 bottoms in its cylinder, in which position it is illustrated in FIGURE 2, or until the stylus roller engages the workpiece surface and causes downward movement of the valve member in the valve sleeve so as to interrupt the supply of pressure fluid to the upper side of piston 36.

If the stylus roller is caused to move downwardly, as, for example, by the eccentricity of the workpiece, the valve member will be moved downwardly so as to cause ports 116 to communicate with ports 114 whereupon fluid will pass from the upper side of piston 36 to exhaust whereupon the tracer slide will move downwardly until the valve member is returned to its intermediate position within the valve sleeve.

According to the present invention the surface engaged by the stylus roller is maintained clean by a wiper 121 spring urged against the workpiece in advance of the engagement of the workpiece by the stylus roller by a compression spring 122 carried by wiper guide bracket 124. The wiper may comprise any suitable non-abrasive member that will wipe the surface of the workpiece clean, as, for example, graphite.

It will be evident from the foregoing that the filleting of the pin journals of the crankshafts can be accomplished very readily without forming shoulders at the ends of pin journals and without the tools taking too great a cut merely by so relatively adjusting the stylus and the filleting tools that the tools take the desired cut. The entire tool block is fed toward the work and the cut taken by the filleting tools is concentric with the pin journal on account of the stylus control. When the feed is halted the filleting tools will stop cutting, except for any cleanup, with the surface turned thereby remaining concentric with the surface engaged by the stylus.

Since the filleting is usually done in a different machine from the one in which the pin journals are turned, it will be evident that some slight misalignment of the pins of the crankshafts being turned from the pins of the master cranks might result, or the pins themselves might be slightly eccentric due to differences in the machines, but by the practice of the present invention such irregularities are compensated for.

The elimination of shoulders at the ends of pin journals is important because such shoulders form regions of extremely high stress that could lead to breaking of the crankshaft when under load.

It will be evident that other turning operations could be carried out by utilizing the integral tool blocks and servomotor construction of the present invention and that the servo mechanism would prevent the tool taking too great a cut if the region being cut thereby should be eccentric or have an irregular surface.

Adjustment of the stylus roller relative to the tool can be accomplished by removing the stylus slide and adjusting the screw 78 but such adjustment can also be effected from externally of the stylus slide as by the arrangement of FIGURE 9 wherein the stylus slide is adjustable vertically relative to rod 76 by means of wedge block 128 which can be moved back and forth in the stylus slide from externally thereof by availing of screw 130.

It will be apparent that the present invention is useful in circumstances other than turning fillets at the ends of pin journals of the crankshaft. For example, cam shafts could be treated in the same manner and fillets could be turned at the ends of the line bearings of the crankshaft with the arrangement of the present invention insuring that the fillets would be concentric with the adjacent journals. Other situations in which the unitary servomotor controlled tool block of the present invention could be employed will occur to those skilled in the art.

In addition to the specific examples described in the specification, a tool block according to the present invention could be utilized, for example, in a roll turning lathe for filleting portions of a roll in order to hold the portions exactly concentric with other of the roll portions. Furthermore, the cutting tool referred to could be a grinding wheel and the same advantageous control of the depth of cut taken thereby would be had by the practice of the present invention. It will accordingly be understood that it is intended to include within the purview of this invention any machine tool installation in which the servomotor controlled tool block of the present invention would be applicable.

It will be understood that this invention is susceptible to modification in order to adapt it to different usages and conditions; and, accordingly, it is desired to comprehend such modifications within this invention as may fall within the scope of the appended claims.

I claim:

1. A tool block for a machine tool comprising; a main body, a slide slidably guided on the body, spaced filleting tools on the slide, a cylinder in the slide, a piston attached to the body and extending into the cylinder, a valve bore in the slide, passages in the slide leading from the valve bore to the cylinder on opposite sides of the piston and other passages in the slide leading from the valve bore to a source of pressure and to exhaust, a valve member in the bore controlling said passages and moveable in the bore for reversibly supplying fluid to said piston, a spring urging the valve member in one direction, a stylus engageable with the work being turned for moving the valve member in the other direction, said stylus being moveable radially of the work being turned and engaging the work between and closely adjacent the said tools in a region having an axial surface which is to blend without interruptions directly into the surfaces cut by said tools, and means connecting the stylus with the valve member for adjustment of the stylus thereon in the direction of movement of the valve member, there being resilient wiper means carried by the slide engaging the workpiece in advance of the stylus to clean the workpiece surface, there being guide means guiding the stylus on the slide.

2. In a tool block, a main body adapted for being fixedly mounted on a tool slide, a guideway on the outer face of the body, a tracer controlled slide mounted in the guideway and extending outwardly from the body, spaced filleting tools on the said tracer controlled slide to engage a workpiece to be turned thereby, a fluid motor connected between the tracer controlled slide and body, said fluid motor having a piston fixed to said body and a cylinder formed in the tracer controlled slide receiving said piston, a control valve in the tracer controlled slide, passage means in the tracer controlled slide hydraulically connecting said valve with the said cylinder of said motor, said valve being moveable for reversibly supplying fluid to said cylinder, a stylus slidably guided on the tracer controlled slide connected directly with said valve moveable radially of the work for engaging the work between and closely adjacent the tools thereby to control the depth of cut of the tools, said stylus engaging an axial surface of the work which is to blend without interruptions into the surfaces cut by said tools, and auxiliary guide means on the body guiding the tracer controlled slide on the body and engaging the tracer controlled slide outwardly of the said guideways.

3. In a tool block; a body, a slide on the body, spaced filleting tool means on the slide, a fluid motor between the body and slide, a reversing valve in the slide to control the motor and spring urged in one direction, passages in the slide hydraulically connecting the valve with the motor and for the supply of pressure fluid to the valve and the exhausting of fluid therefrom, a stylus reciprocably mounted on said slide connected directly with the valve to move the valve in the other direction, and means guiding the stylus in reciprocating movement on the slide comprising portions of the stylus and slide which are in telescoping relation, and antifriction bearing means between said portions, said stylus being moveable radially of the work and being located between said tools so as to be engageable with a turned journal whereby the said tools will turn the fillets at the ends of the journal.

4. In a tool block; a body adapted for mounting on a tool slide, a controlled tracer slide on the body, spaced filleting tool means on the tracer controlled slide, a fluid motor connected between the body and tracer controlled slide, a valve on the tracer controlled slide hydraulically connected to motor and spring urged in one direction, a stylus reciprocably mounted on said tracer controlled slide connected directly with the valve to move the valve in the other direction, said stylus being moveable radially of the work, means guiding the stylus in reciprocating movement on the tracer controlled slide comprising portions of the stylus and tracer controlled slide which are in telescoping relation, bearing raceways formed on the adjacent surfaces of said portions, and antifriction bearing elements fitted into the space between said raceways, one of said raceways being adjustable for adjusting the space between said raceways, there being passage means in said tracer controlled slide leading between the said valve and the said motor forming the said connection therebetween, said stylus engaging an axial surface of the work being turned between said tools and closely adjacent thereto.

5. In a machine tool; means to support work to be turned, a tool slide, a tool block attached to the slide to move therewith, said tool block comprising a body part fixed to said slide and a second slide slidably guided on the body part, spaced filleting tools on the second slide, a fluid motor connected between the body part and second slide, a valve on the second slide reversibly controlling the supply of fluid to said motor, a spring biasing the valve in one direction radially of work being turned by said tools to energize the motor to advance the second slide and tools on the body toward the work, and a stylus directly attached to the valve positioned to engage the work between and closely adjacent the tools to control the depth of cut taken by the tools, said tools comprising filleting tool means to turn fillets at the ends of a turned journal, and said stylus engaging said journal whereby the fillets turned are concentric with and blend into the journals.

(References on following page)

References Cited in the file of this patent

UNITED STATES PATENTS

| | | |
|---|---|---|
| 1,370,743 | Hagman | Mar. 8, 1921 |
| 1,783,755 | Trefethen | Dec. 2, 1930 |
| 1,976,459 | Quichon | Oct. 9, 1934 |
| 2,025,748 | Howe | Dec. 31, 1935 |
| 2,146,774 | Snader | Feb. 14, 1939 |
| 2,639,562 | Balsinger | May 26, 1953 |
| 2,819,639 | Grover | Jan. 14, 1958 |
| 2,877,677 | Granberg | Mar. 17, 1959 |